(12) United States Patent
Anderson et al.

(10) Patent No.: US 9,283,734 B2
(45) Date of Patent: Mar. 15, 2016

(54) MANUFACTURING APPARATUS AND METHOD OF FORMING A PREFORM

(75) Inventors: Neil Anderson, Calumet, MI (US); Matt Kero, Calumet, MI (US)

(73) Assignee: GUNITE CORPORATION, Evansville, IN (US)

( * ) Notice: Subject to any disclaimer, the term of this patent is extended or adjusted under 35 U.S.C. 154(b) by 649 days.

(21) Appl. No.: 13/149,292

(22) Filed: May 31, 2011

(65) Prior Publication Data

US 2012/0183707 A1 Jul. 19, 2012

Related U.S. Application Data

(60) Provisional application No. 61/396,596, filed on May 28, 2010.

(51) Int. Cl.
*B29C 65/00* (2006.01)
*B29C 53/80* (2006.01)
(Continued)

(52) U.S. Cl.
CPC . *B32B 18/00* (2013.01); *B28B 1/42* (2013.01); *B28B 21/22* (2013.01); *B28B 21/42* (2013.01);
(Continued)

(58) Field of Classification Search
CPC ...... B28B 21/42; B28B 21/22; B28B 21/245; B28B 21/48; B28B 21/64; B28B 21/24; B28B 21/242; B28B 21/52; B28B 21/78; B28B 21/72; B65H 81/00; B65H 81/06; B29C 47/00; B29C 47/0004; B29C 47/0023; B29C 47/0066; B29C 47/0064; B29C 47/0059; B29K 2909/02; B29K 2105/06; B29K 2105/12; C04B 2235/6021; C04B 35/64; C04B 35/62625; C04B 35/6224; C04B 35/76; C04B 35/10; C04B 35/563; C04B 35/565

USPC ......... 156/304.1, 157, 159, 244.11, 218, 187, 156/184; 428/34.5; 138/156

See application file for complete search history.

(56) References Cited

U.S. PATENT DOCUMENTS 1,768,451 A * 6/1930 Hume ..................... B28B 21/26
138/175
2,196,570 A * 4/1940 Walters ................... F16D 13/64
139/383 R (Continued)

FOREIGN PATENT DOCUMENTS

EP 0206310 A2 12/1986
EP 0516673 B1 12/1992

(Continued)

OTHER PUBLICATIONS

Article entitled "Liquid State Fabrication of Metal Matrix Composites" from the website created by Dr. Dmitri Kopeliovich; dated Feb. 4, 2008; http://www.substech.com/dokuwiki/doku.php?id=liquid_state_fabrication_of_metal_matrix_composites.

(Continued)

*Primary Examiner* — Alex Efta
(74) *Attorney, Agent, or Firm* — Howard & Howard Attorneys PLLC

(57) ABSTRACT

The present invention provides for a manufacturing apparatus for forming a ceramic preform from an extrudate having a first end and a second end. A cutter forms the first and second ends of the extrudate complementary to each other such that the first and second ends of the extrudate align with each other in a spaced relationship to define a preform having a substantially uniform exterior surface and a substantially uniform thickness. The present invention provides for a method of forming the preform from the extrudate having the first and second ends utilizing a mandrel. The method includes the step of aligning the second end complementary to the first end of the first layer in a spaced relationship to define the preform having the substantially uniform exterior surface and the substantially uniform thickness.

27 Claims, 8 Drawing Sheets

(51) Int. Cl.

| | | |
|---|---|---|
| *B29C 70/86* | (2006.01) | |
| *B29C 53/58* | (2006.01) | |
| *B29C 63/10* | (2006.01) | |
| *B65H 81/00* | (2006.01) | |
| *B32B 27/00* | (2006.01) | |
| *C03B 29/00* | (2006.01) | |
| *B32B 18/00* | (2006.01) | |
| *B29C 47/00* | (2006.01) | |
| *B28B 21/42* | (2006.01) | |
| *B28B 21/22* | (2006.01) | |
| *B28B 21/52* | (2006.01) | |
| *B28B 21/78* | (2006.01) | |
| *B28B 21/72* | (2006.01) | |
| *B28B 1/42* | (2006.01) | |
| *B28B 21/48* | (2006.01) | |
| *C04B 35/117* | (2006.01) | |
| *C04B 35/563* | (2006.01) | |
| *C04B 35/565* | (2006.01) | |
| *C04B 35/63* | (2006.01) | |
| *C04B 35/636* | (2006.01) | |
| *C04B 35/80* | (2006.01) | |
| *C04B 35/64* | (2006.01) | |
| *C04B 35/626* | (2006.01) | |
| *C04B 35/622* | (2006.01) | |
| *C04B 35/76* | (2006.01) | |
| *C04B 35/10* | (2006.01) | |
| *B29K 105/06* | (2006.01) | |
| *B29K 105/12* | (2006.01) | |
| *B28B 21/24* | (2006.01) | |

(52) U.S. Cl.
CPC ............ *B28B 21/48* (2013.01); *B28B 21/52* (2013.01); *B28B 21/72* (2013.01); *B28B 21/78* (2013.01); *B29C 47/0004* (2013.01); *B29C 47/0023* (2013.01); *B29C 47/0059* (2013.01); *B29C 47/0064* (2013.01); *B29C 47/0066* (2013.01); *C04B 35/117* (2013.01); *C04B 35/563* (2013.01); *C04B 35/565* (2013.01); *C04B 35/6316* (2013.01); *C04B 35/6365* (2013.01); *C04B 35/803* (2013.01); *C04B 35/806* (2013.01); *B28B 21/24* (2013.01); *B28B 21/242* (2013.01); *B29C 47/0019* (2013.01); *B29C 47/0021* (2013.01); *B29K 2105/06* (2013.01); *B29K 2105/12* (2013.01); *B29K 2909/02* (2013.01); *C04B 35/10* (2013.01); *C04B 35/6224* (2013.01); *C04B 35/62625* (2013.01); *C04B 35/64* (2013.01); *C04B 35/76* (2013.01); *C04B 2235/3418* (2013.01); *C04B 2235/5228* (2013.01); *C04B 2235/5248* (2013.01); *C04B 2235/5268* (2013.01); *C04B 2235/5296* (2013.01); *C04B 2235/6021* (2013.01); *C04B 2235/6567* (2013.01); *C04B 2235/77* (2013.01); *C04B 2237/343* (2013.01); *C04B 2237/36* (2013.01); *C04B 2237/365* (2013.01); *C04B 2237/38* (2013.01); *C04B 2237/84* (2013.01); *Y10T 428/1314* (2015.01)

(56) References Cited

U.S. PATENT DOCUMENTS

| | | | |
|---|---|---|---|
| 2,262,242 A | 11/1941 | Lenox | |
| 2,671,939 A * | 3/1954 | Everhart | ............... B28B 21/48 156/195 |
| 2,724,671 A * | 11/1955 | Lombardy | ............ F16D 69/022 156/175 |
| 3,002,433 A | 10/1961 | Dunlap | |
| 3,005,259 A | 10/1961 | Benya et al. | |
| 3,007,553 A | 11/1961 | Sinclair et al. | |
| 3,066,766 A | 12/1962 | Minor et al. | |
| 3,090,114 A | 5/1963 | Sinclair | |
| 3,126,306 A | 3/1964 | Sherman | |
| 3,388,017 A | 6/1968 | Grimsley et al. | |
| 3,564,661 A | 2/1971 | Atwell | |
| 3,697,718 A | 10/1972 | Von Hollen et al. | |
| 3,743,069 A * | 7/1973 | Barnett | ............... B29C 70/347 156/173 |
| 3,794,538 A | 2/1974 | Christie et al. | |
| 3,841,448 A | 10/1974 | Norton, Jr. | |
| 3,870,581 A | 3/1975 | Afflerbach et al. | |
| 3,933,565 A | 1/1976 | Printz et al. | |
| 4,026,690 A | 5/1977 | McClellan | |
| 4,141,481 A | 2/1979 | Van Petten | |
| 4,266,638 A | 5/1981 | Petersen et al. | |
| 4,312,672 A | 1/1982 | Biahak et al. | |
| 4,331,628 A | 5/1982 | Ziegler | |
| 4,448,833 A | 5/1984 | Yamaguchi et al. | |
| 4,513,807 A | 4/1985 | Rose et al. | |
| 4,577,734 A | 3/1986 | Williams | |
| 4,632,720 A | 12/1986 | Meyer et al. | |
| 4,645,553 A | 2/1987 | Languillat | |
| 4,679,681 A | 7/1987 | Creydt et al. | |
| 4,680,224 A * | 7/1987 | O'Connor | ............... 428/298.1 |
| 4,702,877 A | 10/1987 | Davis, Jr. | |
| 4,710,252 A | 12/1987 | Kadunce | |
| 4,772,199 A | 9/1988 | Hartmann | |
| 4,909,301 A | 3/1990 | Riordan et al. | |
| 4,963,301 A | 10/1990 | Davis et al. | |
| 5,002,836 A | 3/1991 | Dinwoodie et al. | |
| 5,068,076 A | 11/1991 | Weaver et al. | |
| 5,108,964 A | 4/1992 | Corbett et al. | |
| 5,112,553 A | 5/1992 | Nedzu | |
| 5,153,057 A | 10/1992 | Corbett et al. | |
| 5,188,787 A | 2/1993 | King et al. | |
| 5,325,941 A | 7/1994 | Farinacci et al. | |
| 5,340,433 A | 8/1994 | Crump | |
| 5,342,463 A | 8/1994 | Addeo et al. | |
| 5,382,399 A | 1/1995 | Moret de Rocheprise et al. | |
| 5,425,907 A | 6/1995 | Gross et al. | |
| 5,433,511 A | 7/1995 | Wei | |
| 5,458,181 A | 10/1995 | Corbett et al. | |
| 5,511,603 A | 4/1996 | Brown et al. | |
| 5,529,620 A | 6/1996 | Corbett et al. | |
| 5,586,963 A | 12/1996 | Lennon et al. | |
| 5,591,292 A | 1/1997 | Blomqvist | |
| 5,637,168 A | 6/1997 | Carlson | |
| 5,662,145 A | 9/1997 | Stagg | |
| 5,798,013 A | 8/1998 | Brandenburger | |
| 5,900,194 A | 5/1999 | Ashton | |
| 6,169,048 B1 | 1/2001 | Sjogren et al. | |
| 6,180,258 B1 | 1/2001 | Klier | |
| 6,306,235 B1 | 10/2001 | Henderson | |
| 6,344,160 B1 | 2/2002 | Holtzberg | |
| 6,413,069 B2 | 7/2002 | Oono et al. | |
| 6,460,597 B1 | 10/2002 | McCullough et al. | |
| 6,488,802 B1 | 12/2002 | Levingston et al. | |
| 6,503,441 B2 | 1/2003 | Corman et al. | |
| 6,530,458 B1 | 3/2003 | Rau, III | |
| 6,537,405 B1 | 3/2003 | Henderson et al. | |
| 6,539,644 B1 | 4/2003 | Araya | |
| 6,548,000 B1 | 4/2003 | Gobled et al. | |
| 6,796,365 B1 | 9/2004 | McCullough et al. | |
| 6,803,003 B2 * | 10/2004 | Rigali | ............... B29C 47/0016 264/172.15 |
| 6,989,067 B2 | 1/2006 | Armstrong, Jr. et al. | |
| 7,052,637 B1 | 5/2006 | Strand et al. | |
| 7,126,257 B2 | 10/2006 | Kampe et al. | |
| 7,175,796 B2 | 2/2007 | Ehnert | |
| 7,208,108 B2 | 4/2007 | Otsuka et al. | |
| 7,216,746 B2 | 5/2007 | Yamamoto et al. | |
| 7,290,506 B2 | 11/2007 | Rau, III et al. | |
| 7,357,976 B2 | 4/2008 | Yamamura et al. | |
| 7,793,703 B2 | 9/2010 | Wood et al. | |
| 2001/0000333 A1 | 4/2001 | Nakao et al. | |
| 2003/0092557 A1 | 5/2003 | Aichele et al. | |
| 2003/0180172 A1 | 9/2003 | Oda | |

(56) References Cited

U.S. PATENT DOCUMENTS

| | | |
|---|---|---|
| 2004/0035547 A1 | 2/2004 | Grether |
| 2004/0048095 A1 | 3/2004 | Crocco et al. |
| 2004/0118547 A1 | 6/2004 | Brown et al. |
| 2004/0141405 A1 | 7/2004 | Blach et al. |
| 2004/0145095 A1 | 7/2004 | McCollum et al. |
| 2004/0173291 A1 | 9/2004 | Rozenoyer et al. |
| 2005/0011591 A1 | 1/2005 | Murty et al. |
| 2005/0183909 A1 | 8/2005 | Rau, III et al. |
| 2005/0217950 A1 | 10/2005 | Jolley, Jr. et al. |
| 2005/0241434 A1 | 11/2005 | Persson et al. |
| 2005/0253302 A1 | 11/2005 | Nun et al. |
| 2005/0260408 A1 | 11/2005 | Anand et al. |
| 2006/0027429 A1 | 2/2006 | Knight et al. |
| 2006/0057356 A1 | 3/2006 | Yamamura et al. |
| 2006/0243421 A1 | 11/2006 | Zhang et al. |
| 2006/0263574 A1 | 11/2006 | Tsunekawa et al. |
| 2006/0293454 A1 | 12/2006 | Nadella et al. |
| 2006/0293457 A1 | 12/2006 | Nadella et al. |
| 2007/0131374 A1 | 6/2007 | Zhang et al. |
| 2007/0170016 A1 | 7/2007 | Yamamoto et al. |
| 2008/0135359 A1 | 6/2008 | Basirico et al. |
| 2008/0220234 A1 | 9/2008 | Ko et al. |
| 2008/0264595 A1 | 10/2008 | Bushby |
| 2008/0310989 A1 | 12/2008 | Tschofen |
| 2008/0318042 A1 | 12/2008 | Kusek |
| 2009/0309252 A1 | 12/2009 | Schuetz et al. |
| 2009/0309262 A1* | 12/2009 | McCullough ......... B28B 11/245 264/310 |
| 2009/0312174 A1* | 12/2009 | McCullough ......... B28B 11/245 501/92 |
| 2010/0001231 A1 | 1/2010 | Loukus et al. |
| 2011/0061830 A1 | 3/2011 | Wood et al. |

FOREIGN PATENT DOCUMENTS

| | | | | |
|---|---|---|---|---|
| EP | 0686082 B1 | 12/1995 | | |
| EP | 1308263 A2 | 5/2003 | | |
| EP | 2289690 A2 | 3/2011 | | |
| GB | 410734 A | * | 5/1934 | ............. B28B 21/10 |
| GB | 674994 A | | 7/1952 | |
| GB | 1462888 A | | 1/1977 | |
| JP | 6340475 A | | 12/1994 | |
| WO | 2004018718 A1 | | 3/2004 | |
| WO | 2006113762 A2 | | 10/2006 | |
| WO | 2007033378 A1 | | 3/2007 | |
| WO | 2008066768 A1 | | 6/2008 | |
| WO | 2009154728 A2 | | 12/2009 | |
| WO | 2009154734 A2 | | 12/2009 | |

OTHER PUBLICATIONS

Article entitled "Emerging Applications of Ceramic and Metal Matrix Composites" from the website About.com: Composites/Plastics; dated Sep. 19, 2005; http://composite.about.com/od/aboutcompositesplastics/1/aa030205.htm.

Article entitled "Optimization of the Squeeze Casting Process for Aluminum Alloy Parts" from the Office of Industrial Technologies Energy Efficiency and Renewable Energy , US Department of Energy; dated Sep. 10, 2006; www.dmseg5.case.edu/Groups/CMPL/projects/cwru__optimize__al.pdf.

Article entitled "Metal Matrix Composites" from the website Composites-By-Design; dated Mar. 21, 2008; http://www.composites-by-design.com/metal-matrix.htm.

Article entitled "Metal Matrix Composite" from Wikipedia, the free encyclopedia; dated Aug. 8, 2004; http://en.wikipedia.org/wiki/Metal__matrix__composite.

Japanese application, English language abstract, and English language computer generated translation for JP6340475; dated Dec. 13, 1994; 37 pages.

* cited by examiner

MANUFACTURING APPARATUS AND METHOD OF FORMING A PREFORM

CROSS REFERENCE TO RELATED APPLICATION

This application claims the benefit of U.S. Provisional Patent Application Ser. No. 61/396,596, filed on May 28, 2010, the disclosure of which is hereby incorporated by reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. W56HZV-05-C-0760 and W56HZV-11-C-0345 awarded by the U.S. Army Tank & Automotive Command (TACOM).

BACKGROUND OF THE INVENTION

1. Field of the Invention

The present invention relates to a manufacturing apparatus and a method of forming a preform.

2. Description of the Related Art

Manufacturing preforms, such as ceramic preforms, are known in industry. However, current methods for manufacturing ceramic preforms are accomplished through a manual batch mixing process and then manual formation of the desired configuration. Traditionally, preforms shaped as a cylinder are hand formed from a composition. A metal wire is disposed about the preform for strengthening the preform. More specifically, the composition used to produce the preform does not meet the strength requirements for the final preform. As such, the metal wire is required to add strength to the final preform. Preforms having the metal wire as discussed above is disclosed in U.S. Pat. No. 6,530,458.

Therefore, there remains an opportunity to develop a manufacturing apparatus and a method of forming a preform.

SUMMARY OF THE INVENTION

The present invention provides for a manufacturing apparatus for forming a ceramic preform from an extrudate having a first end and a second end. The apparatus includes a multi-screw extruder including at least three intermeshing screws for forming the extrudate. The apparatus also includes a mandrel defining an outer diameter for wrapping the extrudate about the outer diameter to define a plurality of layers disposed on top of each other such that the extrudate defines an inner diameter complementary to the outer diameter of the mandrel. The apparatus further includes a pressure-applying device adjacent the mandrel for applying pressure to the layers of the extrudate. In addition, the apparatus includes a cutter for forming the first and second ends of the extrudate complementary to each other such that the first and second ends of the extrudate align with each other in a spaced relationship to define a preform having a substantially uniform exterior surface and a substantially uniform thickness.

The present invention also provides for a method of forming a preform from an extrudate having a first end and a second end utilizing a mandrel. The method includes the steps of forming the first end of the extrudate, wrapping the extrudate about the mandrel to form a first layer having the first end abutting the mandrel, and applying pressure to the first layer during wrapping of the extrudate about the mandrel. The method further includes the steps of forming the second end of the extrudate complementary in configuration to the first end, wrapping the extrudate about the mandrel to form a second layer on top of the first layer with the second end spaced from the mandrel, and applying pressure to the second layer during wrapping of the extrudate about the mandrel. The method also includes the step of aligning the second end complementary to the first end of the first layer in a spaced relationship to define the preform having a substantially uniform exterior surface and a substantially uniform thickness.

The present invention further provides a method of forming a ceramic preform comprising ceramic particles and ceramic fibers having an aspect ratio of greater than or equal to 10:1 and the ceramic fibers substantially randomly orientated in three dimensions utilizing a mandrel and an extruder. Said differently, greater than 90 out of 100 ceramic fibers are randomly oriented in three dimensions in said ceramic article. The method includes the step of extruding the ceramic particles and the ceramic fibers through the extruder to form an extrudate having a first end and a second end. The method also includes the steps of forming the first end of the extrudate, wrapping the extrudate about the mandrel to form a first layer having the first end abutting the mandrel, and applying pressure to the first layer during wrapping of the extrudate about the mandrel. The method further includes the steps of forming the second end of the extrudate complementary in configuration to the first end, wrapping the extrudate about the mandrel to form a second layer on top of the first layer with the second end spaced from the mandrel, and applying pressure to the second layer during wrapping of the extrudate about the mandrel. In addition, the method includes the step of aligning the second end complementary to the first end of the first layer in a spaced relationship to define the preform having a substantially uniform exterior surface and a substantially uniform thickness.

Therefore, the present invention provides for the manufacturing apparatus that allows for an automated production of the preforms thus providing a more efficient process. Wrapping the layers on top of each other provides for the preform to be easily formed of a desired thickness. Additionally, the layers are easily integrated or blended together when the layers are disposed on top of each other. Further, the second end provides one small seam to be integrated or blended into the respective layer. Also, the preform as described herein is easily removable from the mandrel without being damaged and is resistant to cracking.

BRIEF DESCRIPTION OF THE DRAWINGS

Advantages of the present invention will be readily appreciated, as the same becomes better understood by reference to the following detailed description, when considered in connection with the accompanying drawings.

FIG. 7 is a front view of the mandrel of another configuration with the outer surface being tapered and the preform cross-sectioned to illustrate the first, second, and third layers complementary in configuration to the outer surface of the mandrel.

DETAILED DESCRIPTION OF THE INVENTION

Figure 1:
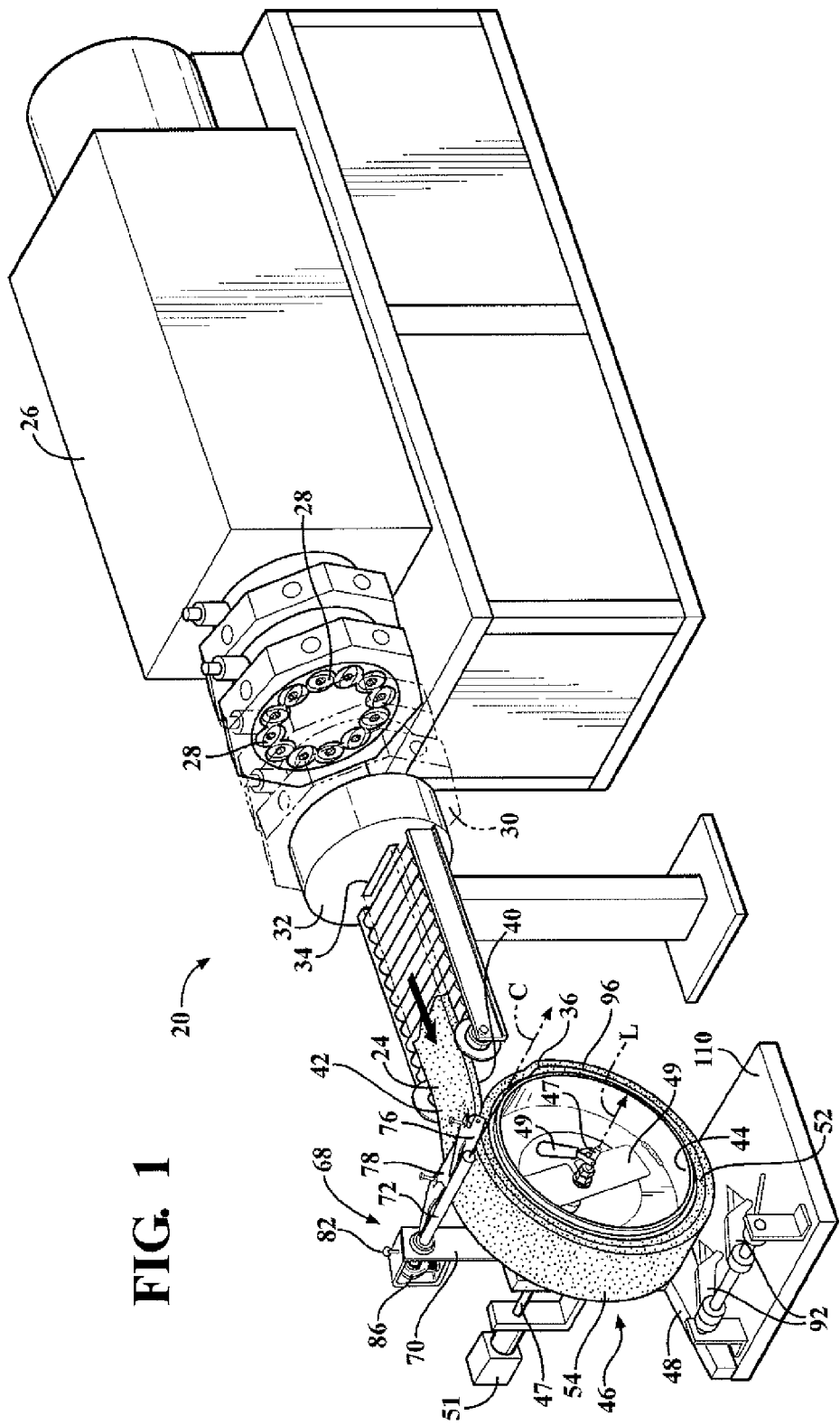
FIG. 1 is a perspective view of the manufacturing apparatus including a pressure-applying device engaging an extrudate wrapped about a mandrel.

Referring to the Figures, wherein like numerals indicate like or corresponding parts throughout the several views, a manufacturing apparatus 20 for forming a ceramic article or preform 22 from an extrudate 24 is generally shown in FIG. 1. More specifically, the manufacturing apparatus 20 is utilized for forming a ceramic preform 22 from the extrudate 24.

The manufacturing apparatus 20 includes a multi-screw extruder 26 for processing a composition for forming the extrudate 24. In other words, the composition is mixed in the multi-screw extruder 26 for forming the extrudate 24. The composition generally comprises ceramic particles and ceramic fibers having an aspect ratio of greater than or equal to 10:1. The ceramic fibers are substantially randomly orientated in three dimensions. It is to be appreciated that the composition can be manufactured from materials other than ceramic particles and ceramic fibers. The composition will be discussed further below.

The multi-screw extruder 26 includes at least three intermeshing screws 28 for processing the composition to form the extrudate 24. The at least three intermeshing screws 28 are formed in a ring configuration. More specifically, the at least three intermeshing screws 28 are generally arranged in a fixed ring configuration and geared to a common motor. In one embodiment, the at least three intermeshing screws 28 are further defined as twelve intermeshing screws 28 which are formed in the ring configuration. The screws 28 also rotate at a common speed as is known in the industry. The screws 28 can be co-rotating or counter-rotating. In addition, the screws 28 can be self-wiping. It is to be appreciated that the screws 28 can be any suitable configuration and can rotate as desired.

Processing the composition for forming or extruding the extrudate 24 can be further defined as rotating the at least three intermeshing screws 28 at about 20 to 1,200 rpm and more specifically about 100 to 400 rpm. As the intermeshing screws 28 rotate, the composition is conveyed, mixed, and advanced through the multi-screw extruder 26 until the composition exits the multi-screw extruder 26.

The multi-screw extruder 26 has a modular design and comprises solid barrels and/or combination barrels. The combination barrels include ports for injecting materials and/or for venting volatile gases. It is to be appreciated that one skilled in the art can select a combination of solid barrels and combination barrels to provide desired mixing characteristics of the multi-screw extruder 26 and desired physical properties of the extrudate 24.

The multi-screw extruder 26 can also include flow blocking flights for providing separate mixing processes in the multi-screw extruder 26. The flow blocking flights can be flighted and can impede passing of the composition between sections of the multi-screw extruder 26. It is to be appreciated that certain flow blocking flights can be removed for increasing the feeding capability of the multi-screw extruder 26.

The multi-screw extruder 26 has 2 to 8 mixing zones, and in one embodiment has 4 to 6 mixing zones. It is to be appreciated that the multi-screw extruder 26 can have more or less mixing zones as desired. The multi-screw extruder 26 also has an L/D ratio of from about 18 to 56, and in one embodiment has an L/D ratio of from about 20 to 44. A suitable multi-screw extruder 26 is a 3+ RingExtruder commercially available from Century, Inc. of Traverse City, Mich.

The multi-screw extruder 26 generally elongates and shears the composition to provide distributive and dispersive mixing to both randomly orient the ceramic fibers in three dimensions and homogeneously distribute dispersed the ceramic fibers. Extruding the composition generally includes arranging adjacent the ceramic fibers in different dimensions so that adjacent ceramic fibers arranged in different dimensions are present in the extrudate 24 in an amount of greater than 85 parts by volume based on 100 parts by volume of the extrudate 24. In one embodiment, greater than 85 parts by volume of the ceramic fibers are uniformly distributed on a scale of twice the diameter of the ceramic fibers. That is, the multi-screw extruder 26 provides excellent elongational and low-intensity shear mixing that results in adjacent ceramic fibers oriented in different dimensions in the extrudate 24.

The multi-screw extruder 26 can also mix an organic binder into the composition. In one embodiment, the organic binder comprises cellulose ether. Cellulose ether generally exhibits reverse thermal gelation and provides lubricity during formation of the preform 22. Without intending to be limited by theory, it is believed that the cellulose ether also provides surface activity, plasticity, uniform rheology, strength, and uniform distribution of air during formation of the preform 22. Cellulose ether is generally selected from the group of methyl cellulose, hydroxypropylmethylcellulose, hydroxybutylmethylcellulose, and combinations thereof. One example of a suitable methyl cellulose is hydroxypropylmethylcellulose, commercially available under the trade name Methocel™ A4M from The Dow Chemical Company of Midland, Mich. It is to be appreciated that any suitable organic binder can be utilized.

The multi-screw extruder 26 can also mix a filler into the composition. It is to be appreciated that one skilled in the art can select the filler to control the density of the extrudate 24. That is, the filler is included in the composition according to the weight percent of the ceramic particles and the ceramic fibers in the composition. The filler generally spaces out the ceramic particles and the ceramic fibers to provide the extrudate 24 and the preform 22 with the desired density and/or to allow effective metal infiltration during any secondary processing of the preform 22, such as infiltrating the preform 22 with a metal. The filler is selected to burn off during heating of the extrudate 24 or preform 22 as discussed further below. The filler can be selected from walnut shell flour, cellulose fiber, air, and combinations thereof. One example of a suitable filler is walnut shell flour, commercially available under from Ecoshell of Corning, Calif. It is to be appreciated that any suitable filler can be utilized.

The multi-screw extruder 26 can also mix an inorganic binder into the composition. In one embodiment, the inorganic binder is silica. Without intending to be limited by theory, it is believed that the inorganic binder provides the preform 22 with strength. One example of a suitable inorganic binder is silica, commercially available under the trade name Bindzil 1440 Colloidal Silica from Wesbond Corporation of Wilmington, Del. It is to be appreciated that any suitable inorganic binder can be utilized.

The multi-screw extruder 26 includes an exiting end 30 having a die plate 32 coupled to the exiting end 30 of the multi-screw extruder 26. The composition is defined as the extrudate 24 once the composition has been processed in and exits the multi-screw extruder 26. As such, once the composition exits the exiting end 30 of the multi-screw extruder 26, the composition will be referred to as the extrudate 24. The die plate 32 shapes the extrudate 24 in a desired configuration as the composition exits the multi-screw extruder 26. More specifically, the die plate 32 defines a bore 34 of the desired configuration for allowing the composition to pass through the die plate 32 to form the desired configuration of the extrudate 24. As the composition exits the multi-screw extruder 26, the composition is forced through the bore 34 of the die plate 32. The extrudate 24 moves away from the multi-screw extruder 26 in a first direction as indicated in FIG. 1. The extrudate 24 defines a continuous piece of extrudate 24 as the extrudate 24 exits the exiting end 30 of the multi-screw extruder 26. For example, the extrudate 24 can define a generally rectangular cross-section when exiting the die plate 32. It is to be appreciated that the extrudate 24 can be any suitable configuration.

Generally, the extrudate 24 defines an initial temperature of from about 50 to 100 degrees Fahrenheit as the extrudate 24 exits the multi-screw extruder 26. In other words, the composition or extrudate 24 exits the multi-screw extruder 26 at the initial temperature of from about 50 to 100 degrees Fahrenheit.

Figure 3:
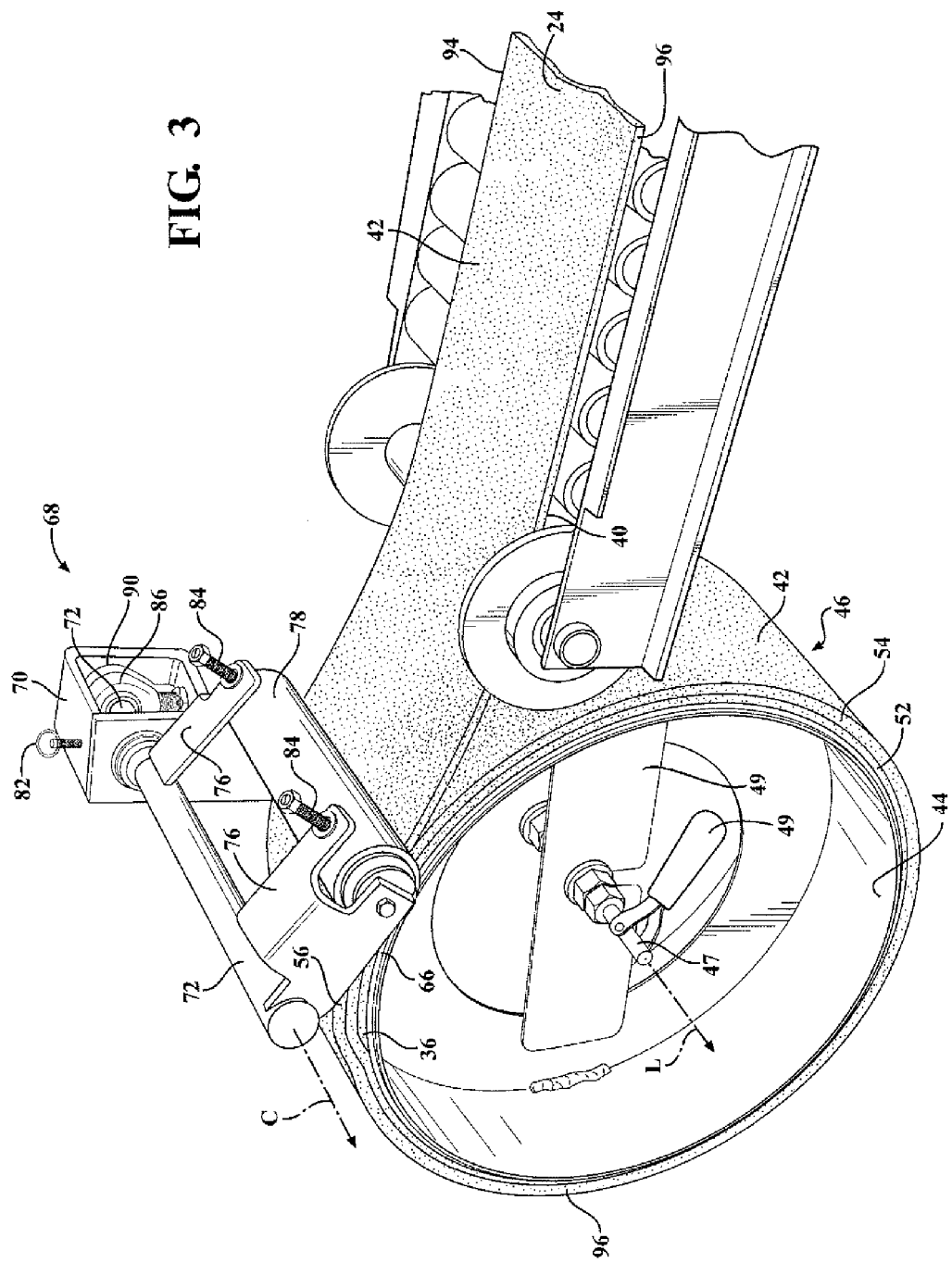
FIG. 3 is a perspective view of the first layer abutting the mandrel, a second layer on top of the first layer, and a third layer being disposed on top of the second layer with the pressure-applying device engaging the third layer.
Figure 4:
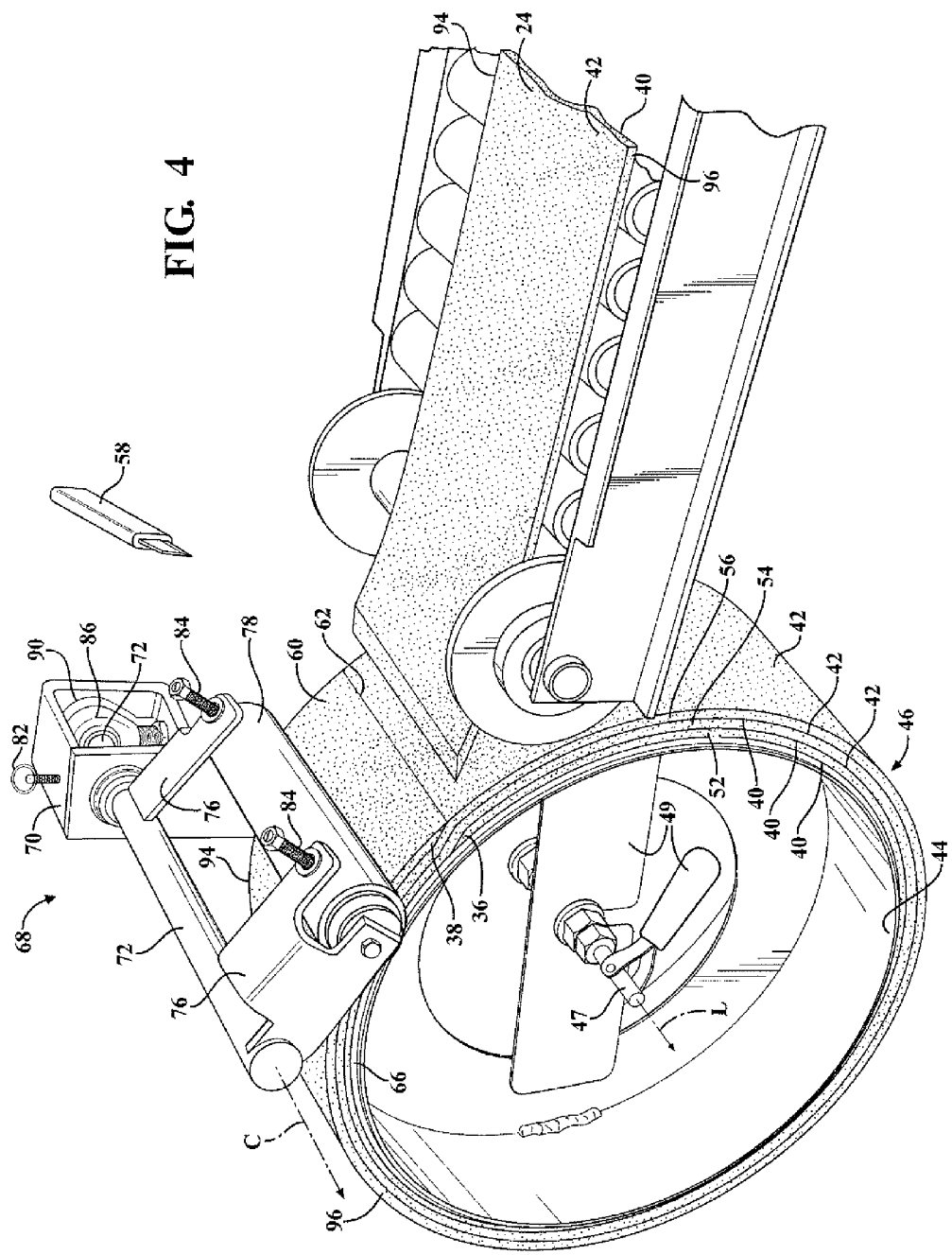
FIG. 4 is a perspective view of a second end of the third layer cut to define a preform with the pressure-applying device engaging the third layer.
Figure 5:
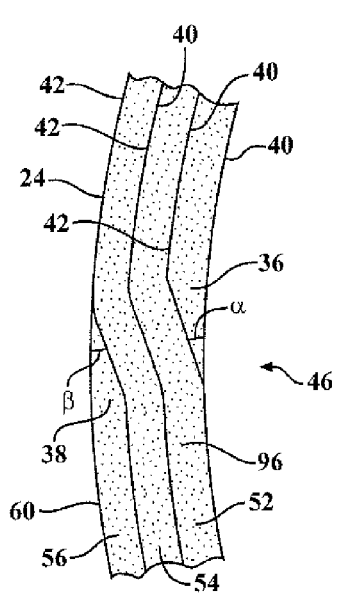
FIG. 5 is an enlarged-broken side view of the layers disposed on top of each other at the first and second ends.

Referring to FIGS. 2-5, the extrudate 24 has a first end 36 defining a first configuration and a second end 38 defining a second configuration with the first and second ends 36, 38 spaced from each other. In addition, the extrudate 24 includes a first side 40 and a second side 42 opposing the first side 40. The extrudate 24 defines the continuous piece of extrudate 24 between the first and second ends 36, 38. The first configuration and the second configuration are each angled such that the first and second ends 36, 38 complement each other. More specifically, as best shown in FIG. 5, the first end 36 of the extrudate 24 defines a first angle $\alpha$ relative to the first side 40 and the second end 38 of the extrudate 24 defines a second angle $\beta$ relative to the second side 42. The first and second ends 36, 38 can be cut at any suitable angle, such as, for example, approximately 45 degrees or less. In one embodiment, the first and second angles $\alpha$, $\beta$ are each defined as of from about 30 to 45 degrees. In another embodiment, the first and second angles $\alpha$, $\beta$ are each defined as less than 45 degrees. The first and second ends 36, 38 of the extrudate 24 complement each other such that the first and second ends 36, 38 align with each other in a spaced relationship which is discussed further below. It is to be appreciated that the first and second angles $\alpha$, $\beta$ have been exaggerated for illustrative purposes only.

As best shown in FIGS. 2-4, 6, and 7, the manufacturing apparatus 20 also includes a mandrel 44 adjacent the multi-screw extruder 26 for wrapping the extrudate 24 about the mandrel 44. More specifically, the mandrel 44 is rotatable about a longitudinal axis L transverse to the first direction. Also referring to FIG. 11, the mandrel 44 defines an outer diameter OD for wrapping the extrudate 24 about the outer diameter OD to define a plurality of layers 46 disposed on top of each other such that the extrudate 24 defines an inner diameter ID complementary to the outer diameter OD of the mandrel 44.

A bracket 48 is disposed adjacent the multi-screw extruder 26 for rotatably supporting the mandrel 44. The bracket 48 can be any suitable configuration for supporting the mandrel 44. A pivot 47 is coupled to the bracket 48 and disposed along the longitudinal axis L with the mandrel 44 concurrently rotatable with the pivot 47 about the longitudinal axis L. It is to be appreciated that the mandrel 44 can rotate independently of the pivot 47.

A clamp 49 selectively engages one end of the pivot 47 for securing the mandrel 44 to the pivot 47. The pivot 47 and the clamp 49 cooperate for allowing the mandrel 44 to be easily removable from the pivot 47 and the bracket 48, thus automating production of the preform 22. In addition, a motor 51 is coupled to the pivot 47 for rotating the mandrel 44 about the longitudinal axis L. The motor 51 rotates the pivot 47 which causes the mandrel 44 to rotate about the longitudinal axis L. It is to be appreciated that the motor 51 can be any suitable horsepower and configuration for rotating the mandrel 44.

The mandrel 44 includes an outer surface 50 spaced radially from the longitudinal axis L for wrapping the extrudate 24 about the outer surface 50 of the mandrel 44. The extrudate 24 is wrapped about the mandrel 44 to form a first layer 52. More specifically, as the mandrel 44 rotates about the longitudinal axis L, the first side 40 of the first layer 52 abuts the outer surface 50 of the mandrel 44. The extrudate 24 can continue to be wrapped about the mandrel 44 to form a second layer 54 on top of the first layer 52. As such, the first side 40 of the second layer 54 abuts the second side 42 of the first layer 52 as the mandrel 44 continues to rotate about the longitudinal axis L. Further, the extrudate 24 can continue to be wrapped about the mandrel 44 to form a third layer 56 on top of the second layer 54. Therefore, the first side 40 of the third layer 56 abuts the second side 42 of the second layer 54. Hence, the first 52, second 54, and third 56 layers overlap each other. As alluded to above, the layers 46, and hence, the first 52, second 54, and third 56 layers, each include the first and second sides 40, 42. Simply stated, the layers 46, such as the first 52, second 54, and third 56 layers, are wrapped on the outer surface 50 of the mandrel 44 as the mandrel 44 rotates about the longitudinal axis L. It is to be appreciated that one or more layers 46 can be wrapped about the mandrel 44. It is to further be appreciated that any suitable number of layers 46 can be wrapped about the mandrel 44.

With the first end 36 of the first layer 52 defining the first angle $\alpha$, the second layer 54 ramps up over the first end 36 of the first layer 52 and overlaps the first layer 52. Similarly, when utilizing the third layer 56, the third layer 56 ramps up over the first end 36 in a spaced relationship and overlaps the second layer 54. As such, the first and second ends 36, 38 of the extrudate 24 complement each other such that the first and second ends 36, 38 of the extrudate 24 align with each other in a spaced relationship. Generally, having the first and second ends 36, 38 spaced from each other with at least one layer 46 disposed between the first and second ends 36, 38 minimizes cracking of the preform 22. Each of the layers 46 define approximately one revolution about the mandrel 44. Therefore, for example, the extrudate 24 is wrapped about the mandrel 44 approximately three times to form the first 52, second 54, and third 56 layers.

In addition, the manufacturing apparatus 20 includes a cutter 58 for forming the first and second ends 36, 38 of the extrudate 24 complementary to each other such that the first and second ends 36, 38 of the extrudate 24 align with each other in a spaced relationship to define the preform 22 having a substantially uniform exterior surface 60 and a substantially uniform thickness T. The first and second ends 36, 38 are cut to align with each other in a spaced relationship to define the preform 22. The exterior surface 60 of the preform 22 is an exposed side of the last layer 52, 54, 56. The substantially uniform thickness T is the total combined thickness T of the layers 52, 54, 56 as identified in FIGS. 6 and 7. Further, having the substantially uniform thickness T of the preform 22 also minimizes cracking of the preform 22.

Figure 2:
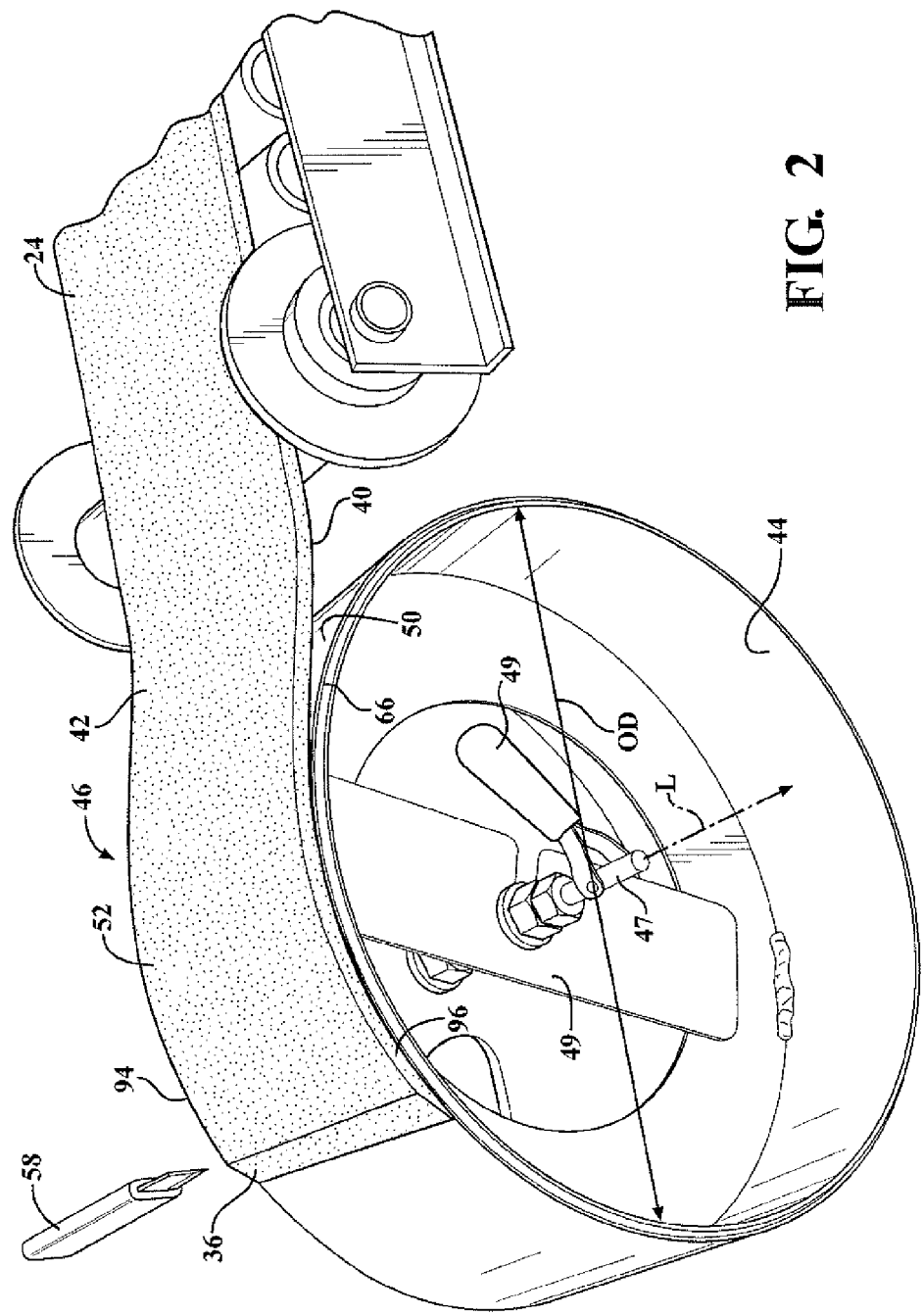
FIG. 2 is a perspective view of a first end of a first layer of the extrudate abutting the mandrel with the pressure-applying device removed.

Turning to FIGS. 2-4, when the process of creating the extrudate 24 begins, the extrudate 24 exiting the die plate 32 must be cut to form the first end 36 defining the first angle α. For example, a portion of the first layer 52 is disposed on the outer surface 50 of the mandrel 44 and then the first layer 52 is cut to form the first end 36 defining the first angle α. It is to be appreciated that the first end 36 of the first layer 52 can be cut before being disposed on the outer surface 50 of the mandrel 44. It is to be appreciated that the first and second ends 36, 38 can be cut by any suitable machine, device, apparatus, by hand, etc. For example, the cutter 58 can be defined as a knife, etc. As such, in one embodiment, the extrudate 24 is cut by hand with the knife.

When the second end 38 is cut to define the second angle β, the preform 22 and the mandrel 44 are ready for the next step of the process, and therefore, are ready to be removed from the bracket 48. Another mandrel can be rotatably coupled to the bracket 48 for forming another preform, and so on. In other words, once the extrudate 24 is wrapped about the mandrel 44 to the desired number of layers 46 and the second end 38 is cut, the mandrel 44 and the preform 22 can be removed from the bracket 48 and replaced by another mandrel for repeating the process of wrapping the extrudate 24 about the second mandrel to form a second preform, etc. Therefore, cutting the second end 38 of the previous preform 22 is also the first end 36 of the next preform. In other words, cutting the second end 38 to the second angle β for the previous preform 22 also creates the first angle α of the first end 36 of the next preform. It is to be appreciated that the first end 36 can be re-cut if desired when starting the next preform.

The second end 38 of the preform 22 defines a seam 62 on the exterior surface 60 of the preform 22. As such, once the second end 38 is cut, the second end 38 or seam 62 is adhered and/or leveled into the second side 42 of the last layer 52, 54, 56 to further define the substantially uniform exterior surface 60. Further, the second end 38 or seam 62 is blended or massaged into the second side 42 of the last layer 52, 54, 56 to integrate or combine the second end 38 into the last layer 52, 54, 56. In other words, the ceramic particles and ceramic fibers, etc. of the second end 38 of one layer 52, 54, 56 is blended/integrated with the ceramic particles and ceramic fibers, etc. of another layer 52, 54, 56.

The extrudate 24 defines the preform 22 when the desired number of layers 46 are wrapped about the mandrel 44 and the second end 38 is cut. For example, if two layers 46 are desired, the first and second layers 52, 54 define the preform 22 once the second end 38 is cut with the second side 42 of the second layer 54 being the exposed side and thus defining the exterior surface 60 of the preform 22. As another example, if three layers 46 are desired, the first 52, second 54, and third 56 layers define the preform 22 once the second end 38 is cut. Hence, if three layers 46 are desired to define the preform 22, the first 52, second 54, and third 56 layers are wrapped on top of each other on the mandrel 44 with the second side 42 of the third layer 56 being the exposed side and thus defining the exterior surface 60 of the preform 22. The second end 38 can be blended or massaged to smooth the last layer 52, 54, 56 and/or decrease the visibility of the second end 38, etc. It is to be appreciated that the desired number of layers 46 wrapped about the mandrel 44 are one continuous piece of extrudate 24.

A first substance can be applied to the first and second ends 36, 38 for increasing adhesion of the extrudate 24. The first substance is applied to the first end 36 prior to wrapping the extrudate 24 about the mandrel 44. Likewise, the first substance is applied to the second end 38 after wrapping the extrudate 24 about the mandrel 44. It is to be appreciated that the first substance can be applied to any of the layers 46 of the extrudate 24. It is also to be appreciated that the first substance can be of any suitable composition, including water, to increase adhesion.

The mandrel 44 is cooled to a first temperature for adhering the extrudate 24 to the mandrel 44. In other words, the mandrel 44 is cooled such that the extrudate 24 sticks to the mandrel 44. More specifically, the mandrel 44 is cooled such that the first side 40 of the first layer 52 adheres to the outer surface 50 of the mandrel 44. Having the extrudate 24 adhere or stick to the mandrel 44 allows the first layer 52 to remain attached to the outer surface 50 of the mandrel 44 as the mandrel 44 rotates about the longitudinal axis L. Generally, the first temperature of the mandrel 44 is below room temperature. In one embodiment, the first temperature of the mandrel 44 is above 40 and below 70 degrees Fahrenheit. In another embodiment, the first temperature of the mandrel 44 is of from about 40 to 60 degrees Fahrenheit. In yet another embodiment, the first temperature of the mandrel 44 is of from about 40 to 50 degrees Fahrenheit.

The mandrel 44 is formed of a metal material. In certain embodiments, the metal material of the mandrel 44 is an alloy. Suitable alloys include aluminum and/or iron alloys. It is to be appreciated that the mandrel 44 can be formed of other material(s).

Figure 6:
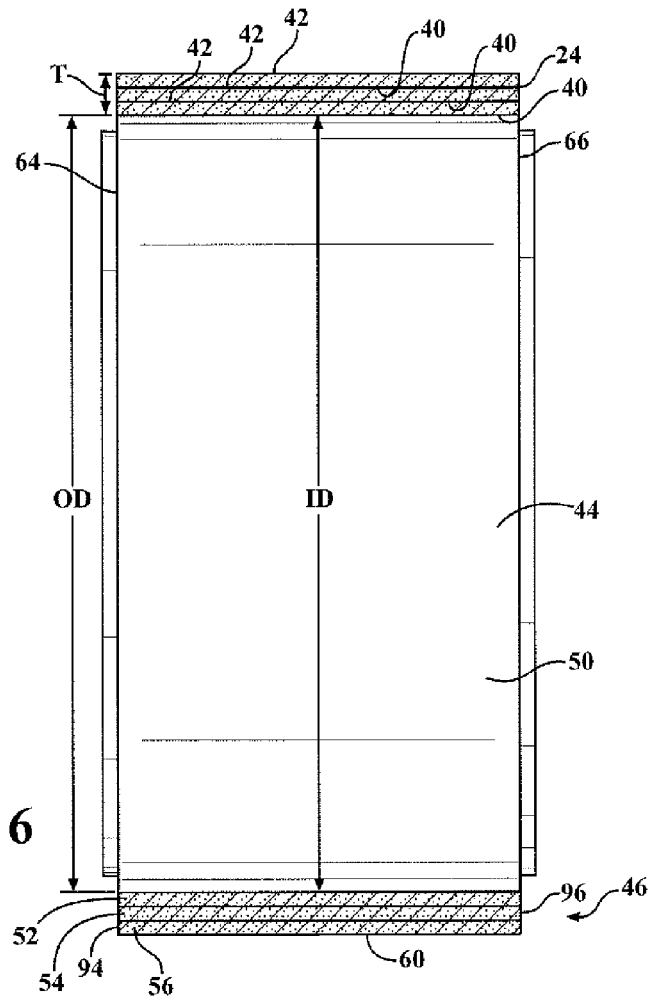
FIG. 6 is a front view of the mandrel including an outer surface being substantially flat with the preform cross-sectioned to illustrate the first, second, and third layers complementary in configuration to the outer surface of the mandrel.

The outer surface 50 of the mandrel 44 includes a first edge 64 and a second edge 66 spaced from each other with the outer diameter OD defined between the first and second edges 64, 66. The outer surface 50 of the mandrel 44 defines an angle γ relative to a plane P parallel to the longitudinal axis L. In one embodiment, the angle γ of the outer surface 50 is 0 degrees such that the outer surface 50 is substantially flat as shown in FIG. 6. Hence, the outer diameter OD of the mandrel 44 remains the same between the first and second edges 64, 66.

Figure 8:
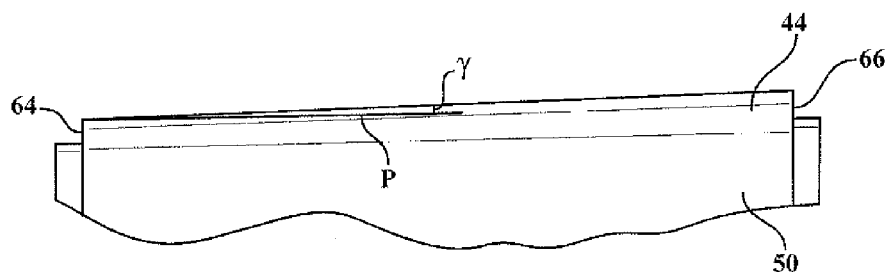
FIG. 8 is an enlarged front view of the mandrel with the outer surface being tapered.

In another embodiment, the angle γ of the outer surface 50 is greater than 0 degrees and less than 3 degrees such that the outer surface 50 is substantially tapered as shown in FIGS. 7 and 8. Hence, the outer diameter OD of the mandrel 44 changes between the first and second edges 64, 66. In other words, the outer diameter OD of the mandrel 44 increases from one of the first and second edges 64, 66 to the other one of the first and second edges 64, 66. As shown in the embodiment of FIGS. 7 and 8, the outer diameter OD of the mandrel 44 adjacent the first edge 64 is less than the outer diameter OD of the mandrel 44 adjacent the second edge 66 with the outer diameter OD gradually increasing from the first edge 64 toward the second edge 66. In certain embodiments, the angle γ of the outer surface 50 is further defined as of from about 0.5 to 2.0 degrees. In one embodiment, the angle γ of the outer surface 50 is defined as 0.75 degrees. It is to be appreciated that the angle γ of the outer surface 50 can be any suitable degree. In addition, it is to be appreciated that the angle γ of the outer surface 50 when tapered and thus the corresponding inner diameter ID of the preform 22, as well as the exterior surface 60 of the preform 22, have been exaggerated for illustrative purposes only.

Having the outer surface 50 of the mandrel 44 being tapered, aids in releasing or removing the preform 22 from the mandrel 44. In other words, the changing outer diameter OD of the outer surface 50 improves the ability to release or remove the preform 22 from the mandrel 44. Utilizing the mandrel 44 including the outer surface 50 having the taper reduces frictional engagement between the preform 22 and the mandrel 44 as the preform 22 is removed from the mandrel 44. More specifically, sliding friction is progressively reduced as the preform 22 separates from the mandrel 44 when utilizing the mandrel 44 including the outer surface 50 having the taper. To remove the preform 22 from the mandrel 44 when the outer surface 50 is tapered, the preform 22 is removed over the first edge 64 until the preform 22 is completely removed from the mandrel 44. In other words, the preform 22 is removed from the first edge 64 of the mandrel 44 defining the smaller outer diameter OD. As the preform 22 moves relative to the mandrel 44, the inner diameter ID of the preform 22 becomes spaced from the outer diameter OD of the mandrel 44 due to the taper and thus frictional engagement between the preform 22 and the mandrel 44 is reduced. Generally, the preform 22 is removed from the mandrel 44 after the preform 22 has been dried as discussed further below.

As best shown in FIGS. 1, 3, 4, and 9, the manufacturing apparatus 20 further includes a pressure-applying device 68 adjacent the mandrel 44 for applying pressure to the layers 46 of the extrudate 24. More specifically, the pressure-applying device 68 applies pressure to the layers 46 as the mandrel 44 rotates about the longitudinal axis L. Hence, the pressure-applying device 68 engages the extrudate 24 for applying pressure to the extrudate 24 to adhere and/or level the layers 46 to further define the substantially uniform thickness T. For example, when utilizing three layers 46, the pressure-applying device 68 applies pressure to the first 52, second 54, and third 56 layers as the mandrel 44 rotates about the longitudinal axis L, thus blending, integrating, or combining the second layer 54 to the first layer 52 and blending, integrating, or combining the third layer 56 to the second layer 54. In other words, the ceramic particles and ceramic fibers, etc. of one layer 52, 54, 56 are blended/integrated with the ceramic particles and ceramic fibers, etc. of another layer 52, 54, 56. Further, the pressure-applying device 68 levels each of the layers 46 and/or levels the exterior surface 60 of the preform 22 to further defining the substantially uniform exterior surface 60. Generally, pressure is applied after the first end 36 of the first layer 52 is disposed on the mandrel 44 and/or after the first end 36 is cut to the first angle α. The application of pressure to level the extrudate 24 ensures a strong bond between the layers 46 that abut each other.

Figure 9:
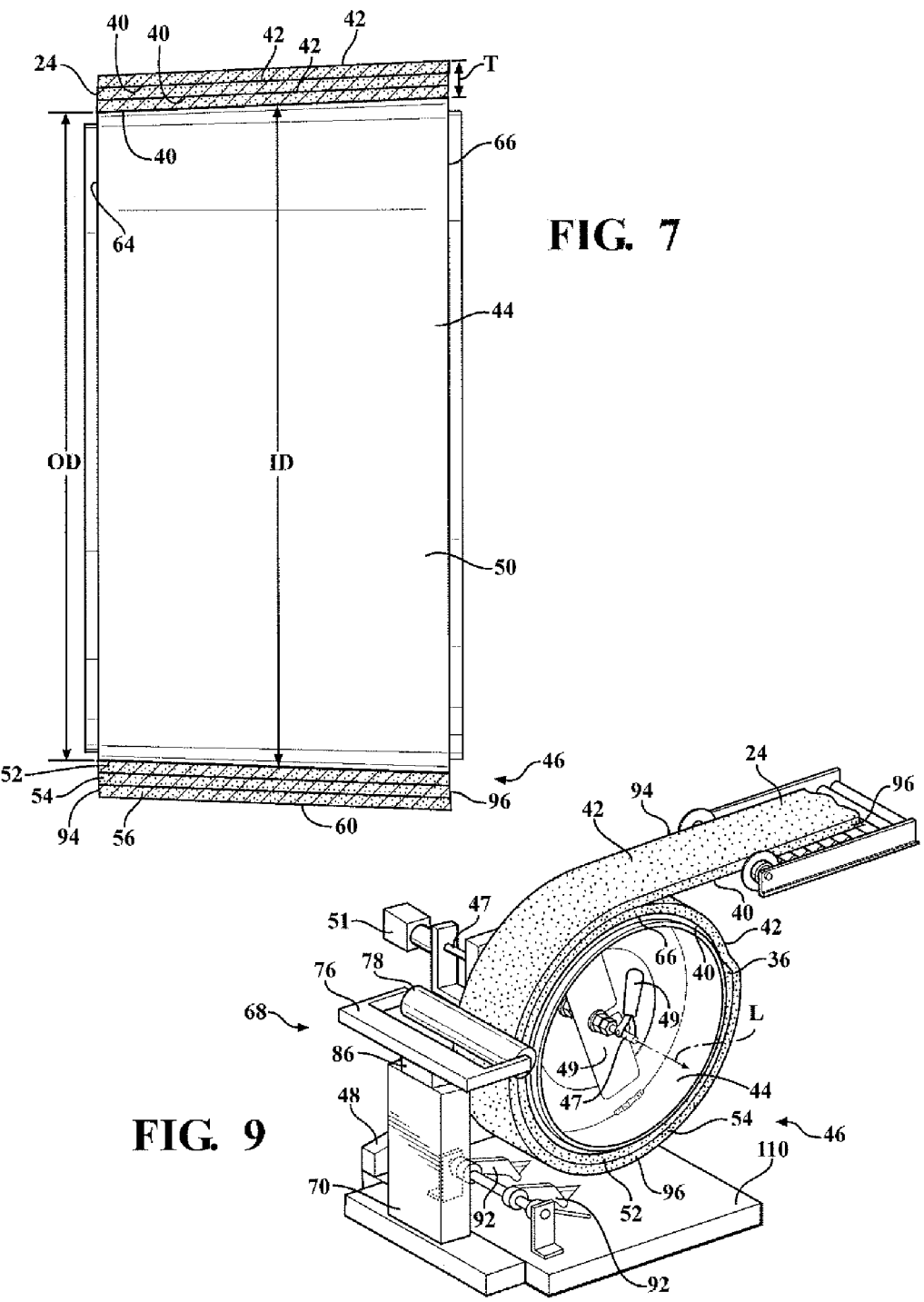
FIG. 9 is a perspective view of another configuration of a pressure-applying device applying pressure to the second layer.

The pressure-applying device 68 can be disposed adjacent the mandrel 44. Further, the pressure-applying device 68 can be attached to the bracket 48 or spaced from the bracket 48 as shown in FIGS. 1 and 9. A brace 70 is disposed adjacent the mandrel 44 for supporting the pressure-applying device 68. The brace 70 can be coupled to the pivot 47 and/or attached to the bracket 48. The pressure-applying device 68 is shown schematically and can be of any suitable configuration. FIGS. 1, 3, and 4 illustrate one configuration of the pressure-applying device 68 and FIG. 9 illustrates another configuration of the pressure-applying device 68.

The pressure-applying device 68 includes a shaft 72 rotatable about a central axis C with at least one support 76 mounted to the shaft 72. In certain embodiments, the support 76 is further defined as a plurality of supports 76 mounted to the shaft 72 and spaced from each other. As such, rotation of the support 72 about the central axis C also causes concurrent rotation of the support(s) 76 about the central axis C. It is to be appreciated that the pressure-applying device can include a sleeve (not shown) disposed about the shaft 72 and rotatable about the central axis C. The sleeve is attached to the shaft 72 such that the shaft 72 and the sleeve concurrently rotate about the central axis C and/or tilt as discussed below. As such, if utilizing the sleeve, the support(s) 76 are mounted to the sleeve. It is to be appreciated that the support(s) 76 can be mounted to the shaft 72 or the sleeve by any suitable method, such as for example, welding, press fit, adhesive, fasteners, etc.

In various embodiments, as shown in FIGS. 1, 3, 4, and 9, the pressure-applying device 68 includes a roller 78 engaging the layers 46 with the roller 78 being rotatable. As shown in FIGS. 1, 3, and 4, the roller 78 is coupled to the support(s) 76 such that the roller 78 is rotatable relative to the support(s) 76. Hence, the roller 78 is coupled to the shaft 72 through the support(s) 76. The roller 78 rotates as the roller 78 engages the extrudate 24 or the layers 46. In other words, the roller 78 rotates during engagement of the extrudate 24 or the layers 46 as the extrudate 24 is wrapped about the mandrel 44. The roller 78 can also concurrently rotate with the support(s) 76 and the shaft 72 about the central axis C such that the roller 78 moves up and/or down relative to the extrudate 24 or the layers 46 to compensate for variances of the extrudate 24 or the layers 46. As such, the roller 78 is allowed to float or adjust as the extrudate 24 is wrapped about the mandrel 44.

Figure 12:
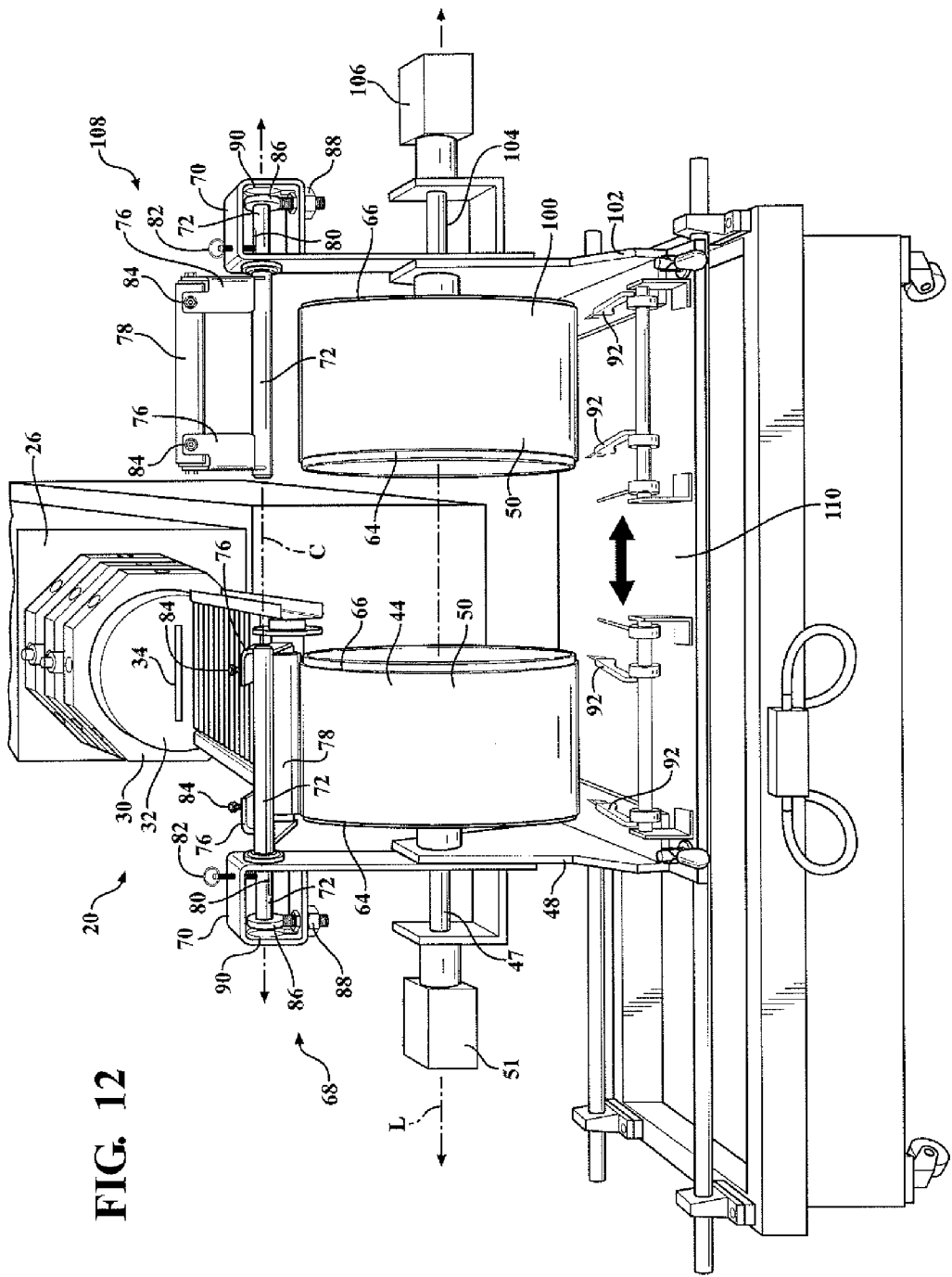
FIG. 12 is a perspective view of the manufacturing apparatus including a first mandrel and a second mandrel coupled to a platform movable relative to a multi-screw extruder.

Further, turning to FIG. 12, the roller 78 can rotate with the support(s) 76 and the shaft 72 about the central axis C for preventing the roller 78 from engaging the mandrel 44 when preparing to wrap the layers 46. In addition, the roller 78 can rotate with the support(s) 76 and the shaft 72 about the central axis C for preventing the roller 78 from engaging the preform 22 when preparing to remove the mandrel 44 and the preform 22 from the pivot 47 or when preparing to couple the mandrel 44 to the pivot 47. As such, the shaft 72 defines a slot 80 with a pin 82 disposed through the brace 70 and in the slot 80 for securing the roller 78 out of engagement from the mandrel 44 or the preform 22. In other words, the pin 82 engages the slot 80 for maintain the roller 78 in an upward position for preventing the roller 78 from engaging the mandrel 44 or the preform 22. It is to be appreciated that the roller 78 can be secured out of engagement from the mandrel 44 or the preform 22 by any suitable method.

In one embodiment, an amount of pressure being applied to the layers 46 can be adjusted by changing the weight of the roller 78. In another embodiment, the amount of pressure being applied to the layers 46 can be adjusted by coupling a weight to the roller 78. More specifically, at least one post 84 extends from one of the support(s) 76 for coupling one or more weights to the post 84. The post 84 can be further defined as a plurality of posts 84 with one of the posts 84 extending from one of the supports 76 and another one of the posts 84 extending from another one of the supports 76. It is to be appreciated that the posts 84 and the supports 76 supporting the posts 84 are spaced from the roller 78 for allowing the roller 78 to rotate without interference from the posts 84 or the supports 76.

The pressure-applying device 68 is disposed complementary to the outer surface 50 of the mandrel 44 for engaging the layers 46. More specifically, when utilizing the three layers 46, the pressure-applying device 68 engages the first 52, second 54, and third 56 layers as the mandrel 44 rotates about the longitudinal axis L. Specifically, the roller 78 is disposed complementary to the outer surface 50 of the mandrel 44 for engaging the layers 46 or the extrudate 24.

The pressure-applying device 68 includes an adjuster 86 for complementing the outer surface 50 of the mandrel 44. As such, the adjuster 86 allows the pressure-applying device 68 to remain substantially parallel to the outer surface 50 of the mandrel 44. In other words, the adjuster 86 allows the roller 78 to adjust in light of the configuration of the outer surface 50 of the mandrel 44. Therefore, the adjuster 86 allows the pressure-applying device 68, and more specifically, the roller 78, to be substantial parallel to the outer surface 50 when flat or tapered while allowing the roller 78 to apply pressure to the layers 46.

The adjuster 86 is coupled to the brace 70 and the shaft 72. More specifically, the adjuster 86 is coupled to an end of the shaft 72 and disposed through the brace 70. The adjuster 86 is threaded and includes a nut 88 cooperating with the threads of the adjuster 86. As such, tightening or loosening the nut 88 causes the adjuster 86 to move the shaft 72 to a desired position which adjusts the roller 78 relative to the outer surface 50 of the mandrel 44. In other words, threading the nut 88 on the adjuster 86 up or down causes the adjuster 86 to move the shaft 72 and correspondingly move the support(s) 76. Movement of the shaft 72 and the support(s) 76 correspondingly moves the roller 78 relative to the outer surface 50 of the mandrel 44. As such, the adjuster 86 allows the shaft 72 and thus the roller 78 to selectively tilt. In addition, the adjuster 86 allows the shaft 72 to rotate about the central axis C relative to the adjuster 86. In other words, for example, when rotating the roller 78 to the upward position, the roller 78, the support(s) 76, and the shaft 72 rotate relative to the adjuster 86. Hence, the adjuster 86 does not rotate about the central axis C. In one configuration, the adjuster 86 can be further defined as a tie rod rotatably attached to the shaft 72. It is to be appreciated that bearings can be utilized for rotatably supporting the shaft 72. It is to further be appreciated that the adjuster 86 can be any suitable configuration for adjusting the roller 78 complementary to the outer surface 50 of the mandrel 44 while also allowing the roller 78 to compensate for variances of the extrudate 24. For example, as shown in FIG. 9, the adjuster 86 is shown schematically with the shaft 72 eliminated such that the support 76 is directly coupled to the roller 78 and the adjuster 86.

As best shown in FIG. 12, the brace 70 defines an aperture 90 generally complementary to the adjuster 86 for removing the adjuster 86 from the brace 70. Generally, the shaft 72 is removed from one side of the brace 70 and the adjuster 86 is removed from another side of the brace 70. As such, the adjuster 86 is removed from the side of the brace 90 defining the aperture 90. It is to be appreciated that in certain configurations, the adjuster 86 and the shaft 72 can both be removed from the brace 70 through the aperture 90. It is to be appreciated that the adjuster 86 and the shaft 72 can be removed from the brace 70 by any suitable method.

A second substance can be applied to the extrudate 24 prior to or simultaneously with applying pressure to the extrudate 24 for assisting with the leveling of the extrudate 24. It is to be appreciated that the second substance can also be of any suitable composition, including water, to increase adhesion. The second substance can be applied to the second side 42 of the layers 46 for assisting the pressure-applying device 68 to level the second side 42 of the layers 46.

Referring back to FIG. 1, the manufacturing apparatus 20 can also include a plurality of second cutters 92 adjacent the mandrel 44 for trimming the extrudate 24 or the layers 46 as the extrudate 24 or the layers 46 are wrapped about the mandrel 44. More specifically, the extrudate 24 includes a first outer edge 94 and a second outer edge 96 spaced from each other adjacent the first and second sides 40, 42 with one of the second cutters 92 adjacent the first outer edge 94 and another one of the second cutters 92 adjacent the second outer edge 96. One of the second cutters 92 trims or cuts the first outer edge 94 of the extrudate 24 and the other one of the second cutters 92 trims or cuts the second outer edge 96 of the extrudate 24. The second cutters 92 can be rotated relative to the mandrel 44 for adjusting the position of the second cutters 92. It is to be appreciated that the first and second outer edges 94, 96 can be trimmed or cut by any suitable machine, device, apparatus, by hand, etc. For example, the second cutters 92 can be defined as a knife, etc. It is to be appreciated that the second cutters 92 as shown in FIG. 1 are rotated out of engagement from the layers 46 for illustrative purposes only.

Figure 10:
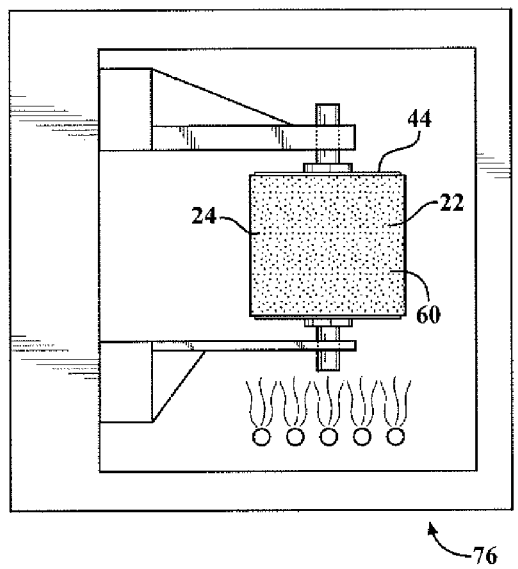
FIG. 10 is a schematic view of the preform in a heating apparatus.

Turning to FIG. 10, the manufacturing apparatus 20 can also include a heating apparatus 98, such as an oven or a kiln. The heating apparatus 98 is shown schematically and it is to be appreciated that the preform 22 can be heated by other methods, such as an open heat source. The heating apparatus 98 heats the preform 22 to a plurality of elevated temperatures. The preform 22 is placed in the heating apparatus 98 and heated to a second temperature. Generally, the preform 22 is disposed on the mandrel 44 during this heating to the second temperature. It is to be appreciated that the preform 22 can be heated to the second temperature by alternative methods. The second temperature is of from about 70 to 200 degrees Fahrenheit. Generally, heating is utilized for evaporating water, burning off any organic binder and filler from the preform 22, and setting the inorganic binder to strengthen the preform 22, which defines void space in the preform 22. As shown, the mandrel 44 with the preform 22, i.e., the mandrel 44 with the wrapped layers 46 of the extrudate 24, is disposed in the oven as a single unit. It should be appreciated that heating the preform 22 can be accomplished through a variety of different methods.

Generally, the preform 22 is heated to the second temperature to dry the preform 22. At this point, the preform 22 is known as an uncured ceramic article. The preform 22 is held at the second temperature until a gel point of the organic binder is reached which occurs after about 90 to 240 minutes. The preform 22 is then removed from the heating apparatus 98 and the mandrel 44.

Once the preform 22 is removed from the mandrel 44, the preform 22 is again placed into the heating apparatus 98 and again heated to the second temperature until the moisture content of the preform 22 is of from about 0 to 18 percent, and more specifically, of from about 5 to 10 percent.

The preform 22 is subsequently heated to a third temperature for about 30 to 90 minutes and more specifically for about 60 minutes for burning off the organic binders and the fillers within the composition. The third temperature is of from about 450 to 700 degrees Fahrenheit and more specifically of from about 475 to 525 degrees Fahrenheit.

The preform 22 is then heated to a fourth temperature for about 90 to 150 minutes and more specifically for about 105 to 135 minutes to set the inorganic binder and provide the preform 22 with excellent strength at high temperatures. The fourth temperature is of from about 1,600 to 2,000 degrees Fahrenheit and more specifically of from about 1,700 to 1,900 degrees Fahrenheit. After the step of heating the preform 22 to the fourth temperature, the preform 22 can be referred to as a cured or sintered ceramic article. After the preform 22 has been cured, the preform 22 can also be machined to a final configuration if desired.

Figure 11:
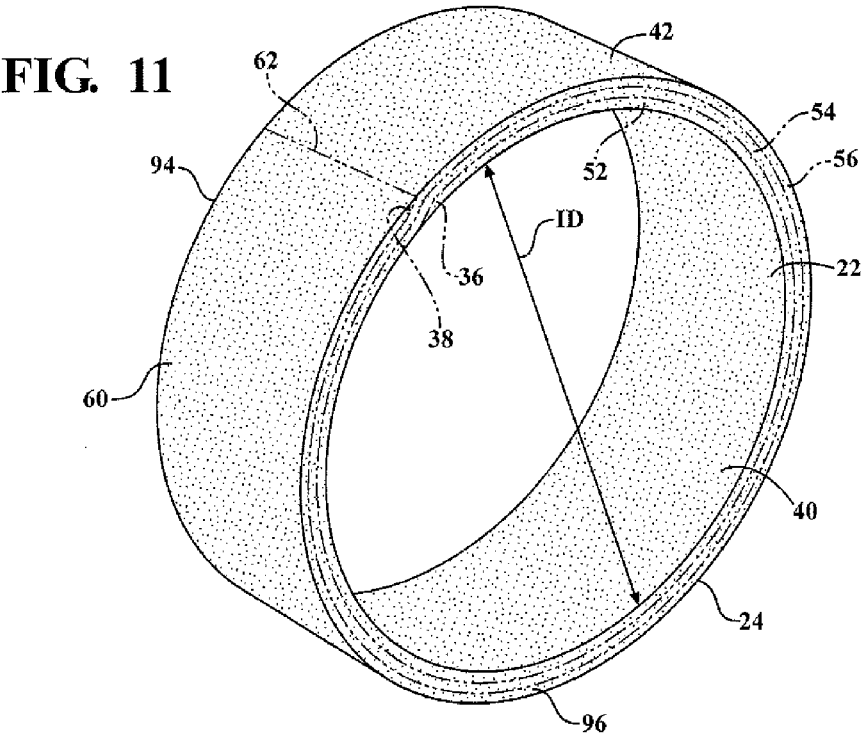
FIG. 11 is a perspective view of the preform after being removed from the mandrel.

FIG. 11 illustrates the preform 22 removed from the mandrel 44 after being heated, etc. and the layers 52, 54, 56 secured to each other to further define the uniform thickness T. In other words, the dash-dot-dot-dash lines of FIG. 11 represent where the initially wrapped layers 52, 54, 56 were prior to curing the preform 22. The configuration of the preform 22, i.e., the wrapped layers 46, allows the preform 22 to be removed from the mandrel 44 without being damaged. In other words, the preform 22 can be removed from the mandrel 44 without the layers 46 or the first and second ends 36, 38 separating, and additional, can be removed from the mandrel 44 without cracking the preform 22.

Referring to FIG. 12, the manufacturing apparatus 20 can be utilized to automate production of the preforms 22. The mandrel 44 is further defined as a first mandrel 44 and the manufacturing apparatus 20 further includes a second mandrel 100 spaced from the first mandrel 44. The second mandrel 100 includes the same components as described above for the first mandrel 44, and therefore, the features of the second mandrel 100 will not be discussed further. As such, the outer surface 50 of the second mandrel 100 can be flat or tapered as discussed above.

The second mandrel 100 is supported by a second bracket 102. A second pivot 104 is coupled to the second bracket 102 with a second motor 106 coupled to the second pivot 104 for rotating the second mandrel 100. It is to be appreciated that the second mandrel 100 can be selectively secured to the second pivot 104 by another clamp 49 engaging one end of the second pivot 104. The second pivot 104 and the clamp 49 cooperate for allowing the second mandrel 100 to be easily removable from the second pivot 104 and the second bracket 102, thus automating production of the preforms 22. The second motor 106 is coupled to the second pivot 104 for rotating the second mandrel 100 about the longitudinal axis L. The second motor 106 rotates the second pivot 104 which causes the second mandrel 100 to rotate about the longitudinal axis L. It is to be appreciated that the second motor 106 can be any suitable horsepower and configuration for rotating the second mandrel 100.

A second pressure-applying device 108 is utilized with the second mandrel 100. The second pressure-applying device 108 is a minor image of the pressure-applying device 68 discussed above, and therefore, the second pressure-applying device 108 includes the same components which will not be discussed further. As such, in FIG. 12, the pressure-applying device 68 for the first mandrel 44 is illustrated with the roller 78 engaging the outer surface 50 of the first mandrel 44 and the second pressure-applying device 108 for the second mandrel 100 is illustrated with the roller 78 in the upward position with the roller 78 prevented from engaging the preform 22 or the second mandrel 100. It is to be appreciated that the second pressure-applying device 108 can be configured as illustrated in the embodiment of FIG. 9.

The first and second mandrels 44, 100 are spaced from each other such that the first mandrel 44 can be removed from the pivot 47 without interfering with the second mandrel 100. Likewise, the second mandrel 100 can be removed from the second pivot 104 without interfering with the first mandrel 44. As such, the first and second mandrels 44, 100 are easily removable from the pivot 47 and the second pivot 104 respectively for automating production of the preforms 22.

The manufacturing apparatus 20 further includes a platform 110 supporting the first and second mandrels 44, 100 for automating production of the preforms 22. Hence, the bracket 48 that supports the first mandrel 44 is attached to the platform 110 and the second bracket 102 that supports the second mandrel 100 is also attached to the platform 110. Further, it is to be appreciated that the brace 70 that supports the pressure-applying device 68 can be attached to the platform 110 and another brace 70 that supports the second pressure-applying device 108 can be attached to the platform 110.

The platform 110 is movable relative to the multi-screw extruder 26 such that the first and second mandrels 44, 100 move relative to the multi-screw extruder 26 for wrapping the extrudate 24 about one of the first and second mandrels 44, 100 while an other one of the first and second mandrels 44, 100 is removable from the platform 110. The platform 110 moves transverse to the first direction of the extrudate 24. In other words, the platform 110 moves back and forth such that one of the first and second mandrels 44, 100 align with the extrudate 24 exiting the die plate 32 of the multi-screw extruder 26 while the other one of the first and second mandrels 44, 100 is offset from the extrudate 24. For example, as shown in FIG. 12, the first mandrel 44 is aligned with the exiting end 30 of the multi-screw extruder 26 while the second mandrel 100 is offset from the exiting end 30.

Once the preform 22 is wrapped about the first mandrel 44 and the second end 38 is cut, the preform 22 is ready for the next step in the process. Therefore, the platform 110 moves transverse to the first direction such that the second mandrel 100 aligns with the extrudate 24 to wrap the extrudate 24 about the second mandrel 100 to form another preform 22. When the extrudate 24 is being wrapped about the second mandrel 100, the preform 22 disposed on the first mandrel 44 can be removed and a third mandrel (not shown) can be coupled to the pivot 47 to form yet another preform 22. Once the preform 22 is wrapped about the second mandrel 100 and the second end 38 is cut, this preform 22 is ready for the next step in the process. As such, the platform 110 again moves transverse to the first direction such that the third mandrel aligns with the extrudate 24 to wrap the extrudate 24 about the third mandrel to form yet another preform 22. This process continues until the desired number of preforms 22 are formed. As such, the platform 110 automates production of the preforms 22, thus more efficiently increasing output of the preforms 22.

Turning to FIGS. 1-4, the present invention further provides a method of forming the preform 22 from the extrudate 24 having the first end 36 and the second end 38 utilizing the mandrel 44. It is to be appreciated that the method as discussed herein can be accomplished by utilizing the manufacturing apparatus 20 as discussed above or by any other suitable apparatus. The composition is processed within the multi-screw extruder 26 with the composition extruded through the die plate 32 to form the extrudate 24. Forming the extrudate 24 can be accomplished by utilizing the multi-screw extruder 26 and the die plate 32 as discussed above or any other suitable process.

The method includes the steps of forming the first end 36 of the extrudate 24, wrapping the extrudate 24 about the mandrel 44 to form the first layer 52 having the first end 36 abutting the mandrel 44, and applying pressure to the first layer 52 during wrapping of the extrudate 24 about the mandrel 44. More specifically, the first end 36 of the extrudate 24 defines the first angle $\alpha$ relative to the first side 40 as discussed above and the step of forming the first end 36 is further defined as the step of cutting the first end 36 to the first angle $\alpha$.

The method further includes the steps of forming the second end 38 of the extrudate 24 complementary in configuration to the first end 36, wrapping the extrudate 24 about the mandrel 44 to form the second layer 54 on top of the first layer 52 with the second end 38 spaced from the mandrel 44, and applying pressure to the second layer 54 during wrapping of the extrudate 24 about the mandrel 44. More specifically, the second end 38 of the extrudate 24 defines the second angle $\beta$ relative to the second side 42 as discussed above and the step of forming the second end 38 is further defined as the step of cutting the second end 38 to the second angle $\beta$.

Hence, the extrudate 24 is defined as the continuous piece of extrudate 24 between the first and second ends 36, 38 as discussed above and the steps of wrapping the extrudate 24 about the mandrel 44 is further defined as the steps of wrapping the continuous piece of extrudate 24 about the mandrel 44 to form the first and second layers 52, 54.

The step of forming the first end 36 occurs before the step of forming the second end 38 and additionally, the step of forming the first end 36 occurs before the step of wrapping the extrudate 24 about the mandrel 44 to form the second layer 54. Further, the step of forming the second end 38 occurs after the step of wrapping the extrudate 24 about the mandrel 44 to form the second layer 54. In addition, the step of applying pressure to the first layer 52 occurs before the step of applying pressure to the second layer 54.

The extrudate 24 includes the first side 40 and the second side 42 opposing the first side 40 such that the first and second layers 52, 54 include the first and second sides 40, 42 as discussed above. As such, the step of wrapping the extrudate 24 about the mandrel 44 to form the first layer 52 is further defined as abutting the first side 40 of the first layer 52 to the mandrel 44. Further, the step of wrapping the extrudate 24 about the mandrel 44 to form the second layer 54 is further defined as abutting the first side 40 of the second layer 54 to the second side 42 of the first layer 52.

In one embodiment, the method further includes the step of wrapping the extrudate 24 about the mandrel 44 to form the third layer 56 on top of the second layer 54. As such, the extrudate 24 is defined as the continuous piece of extrudate 24 such that the steps of wrapping the extrudate 24 about the mandrel 44 is further defined as the steps of wrapping the continuous piece of extrudate 24 about the mandrel 44 to form the first 52, second 54, and third 56 layers. In this configuration, the step of forming the first end 36 occurs before the step of forming the second end 38. In addition, the steps of applying pressure to the first and second layers 52, 54 are further defined as the steps of applying pressure to the first 52, second 54, and third 56 layers during wrapping of the extrudate 24 about the mandrel 44. Further, the step of applying pressure to the first layer 52 occurs before the steps of applying pressure to the second and third layers 54, 56. More specifically, the steps of applying pressure to the first and second layers 52, 54 occur before the step of applying pressure to the third layer 56.

The method also includes the step of aligning the second end 38 complementary to the first end 36 of the first layer 52 in the spaced relationship to define the preform 22 having the substantially uniform exterior surface 60 and the substantially uniform thickness T. In one embodiment, the second layer 54 has the second end 38 and the step of aligning the second end 38 complementary to the first end 36 of the first layer 52 in the spaced relationship is further defined as the step of aligning the second end 38 of the second layer 54 complementary to the first end 36 of the first layer 52 in the spaced relationship to define the preform 22 having the substantially uniform exterior surface 60 and the substantially uniform thickness T. In another embodiment, the third layer 56 has the second end 38 and the step of aligning the second end 38 complementary to the first end 36 of the first layer 52 in the spaced relationship is further defined as the step of aligning the second end 38 of the third layer 56 complementary to the first end 36 of the first layer 52 in the spaced relationship to define the preform 22 having the substantially uniform exterior surface 60 and the substantially uniform thickness T.

Further, the present invention also provides a method of forming the ceramic preform 22 comprising ceramic particles and ceramic fibers having an aspect ratio of greater than or equal to 10:1 and the ceramic fibers substantially randomly orientated in three dimensions utilizing the mandrel 44 and the extruder 26 as discussed above. This method is similar to the method discussed above and therefore can include the steps discussed above for the other method. Only a few of the steps for this other method are set forth below for illustrative purposes.

The method includes the step of extruding the ceramic particles and the ceramic fibers through the extruder 26 to form the extrudate 24 having the first end 36 and the second end 38. The method further includes the steps of forming the first end 36 of the extrudate 24, wrapping the extrudate 24 about the mandrel 44 to form the first layer 52 having the first end 36 abutting the mandrel 44, and applying pressure to the first layer 52 during wrapping of the extrudate 24 about the mandrel 44. In addition, the method includes the steps of forming the second end 38 of the extrudate 24 complementary in configuration to the first end 36, wrapping the extrudate 24 about the mandrel 44 to form the second layer 54 on top of the first layer 52 with the second end 38 spaced from the mandrel 44, and applying pressure to the second layer 54 during wrapping of the extrudate 24 about the mandrel 44.

The method also includes the step of aligning the second end 38 complementary to the first end 36 of the first layer 52 in the spaced relationship to define the preform 22 having the substantially uniform exterior surface 60 and the substantially uniform thickness T. In one embodiment, the method further includes the step of wrapping the extrudate 24 about the mandrel 44 to form the third layer 56 on top of the second layer 54. As such, the extrudate 24 is defined as the continuous piece of extrudate 24 between the first and second ends 36, 38 such that the steps of wrapping the extrudate 24 about the mandrel 44 is further defined as the steps of wrapping the continuous piece of extrudate 24 about the mandrel 44 to form the first 52, second 54, and third 56 layers. Therefore, the third layer 56 has the second end 38 and the step of aligning the second end 38 complementary to the first end 36 of the first layer 52 in the spaced relationship is further defined as the step of aligning the second end 38 of the third layer 56 complementary to the first end 36 of the first layer 52 in the spaced relationship to define the preform 22 having the substantially uniform exterior surface 60 and the substantially uniform thickness T.

It is to be appreciated that the methods as discussed above can include various additional steps. For example, the methods can further include the steps of cooling the mandrel 44 and/or heating the preform 22 to one or more temperatures, as discussed above, etc.

VARIOUS ADDITIONAL EMBODIMENTS

It is contemplated that after the preform 22 is formed according to the instant invention, the preform 22 may be heated, fired, and/or sintered at any temperature as selected by one of skill in the art. After heating, the preform 22 may be described as the ceramic article. In one embodiment, the ceramic article includes the firing (or sintering) product of ceramic particles, ceramic fibers having an aspect ratio of greater than or equal to 10:1, an organic binder comprising a cellulose ether, an inorganic binder comprising silica; and water. It is contemplated that greater than 90 out of 100 ceramic fibers may be randomly oriented in three dimensions in the ceramic article. Additionally, greater than 85 parts by volume of the ceramic fibers may be uniformly distributed in the ceramic article on a scale of twice the diameter of the ceramic fibers. Further, the ceramic article may have a consistent density of from 0.9 to 1.1 g/cm³ in x-, y-, and z-dimensions and/or have a uniform strength in three dimensions as measured in accordance with ASTM C1424. In another embodiment, the ceramic fibers are present in the ceramic article in an amount of from 3 to 15 parts by volume based on 100 parts by volume of the ceramic article. In still another embodiment, the ceramic fibers comprise an element from period 2, 3, 4, or 5 of the periodic table of the elements, such as aluminum, silicon, oxygen, zirconium, or carbon. It is also contemplated that the ceramic fibers may be selected from the group of alumina-silica fibers, alumina-silica-zirconia fibers, carbon-graphite fibers, and combinations thereof. In still another embodiment, the ceramic particles are present in the ceramic article in an amount of from 15 to 30 parts by volume based on 100 parts by volume of the ceramic article. Alternatively, the ceramic particles may include an element from period 2, 3, or 4 of the periodic table of the elements such as silicon, oxygen, carbon, aluminum, or boron. Alternatively, the ceramic particles may be selected from the group of silicon carbide, alumina, boron carbide, and combinations thereof. In one embodiment, the ceramic article is as described in U.S. patent application Ser. No. 12/174,982, which is expressly incorporated herein by reference.

Many modifications and variations of the present invention are possible in light of the above teachings. The foregoing invention has been described in accordance with the relevant legal standards; thus, the description is exemplary rather than limiting in nature. Variations and modifications to the disclosed embodiment can become apparent to those skilled in the art and do come within the scope of the invention. Accordingly, the scope of legal protection afforded this invention can only be determined by studying the following claims.

What is claimed is:

1. A method of forming a preform from an extrudate having a first end and a second end utilizing a mandrel rotatable about an axis and having an outer surface spaced radially from the axis, said method comprising the steps of:
    forming the first end of the extrudate;
    wrapping the extrudate about the mandrel while rotating the mandrel about the axis to form a first layer having the first end abutting the outer surface of the mandrel;
    cooling the mandrel such that the first layer of the extrudate adheres to the outer surface of the mandrel and remains adhered to the outer surface as the mandrel rotates about the axis;
    applying pressure to the first layer during wrapping of the extrudate about the mandrel;
    forming the second end of the extrudate complementary in configuration to the first end;
    wrapping the extrudate about the mandrel while rotating the mandrel about the axis to form a second layer on top of the first layer with the second end spaced from the outer surface of the mandrel;
    applying pressure to the second layer during wrapping of the extrudate about the mandrel; and
    aligning the second end complementary to the first end of the first layer in a spaced relationship to define the preform having a substantially uniform exterior surface and a substantially uniform thickness.

2. The method as set forth in claim 1 wherein the extrudate includes a first side and a second side opposing the first side such that the first and second layers include the first and second sides and wherein the step of wrapping the extrudate about the mandrel to form a first layer is further defined as abutting the first side of the first layer to the mandrel.

3. The method as set forth in claim 2 wherein the step of wrapping the extrudate about the mandrel to form a second layer is further defined as abutting the first side of the second layer to the second side of the first layer.

4. The method as set forth in claim 2 wherein the first end of the extrudate defines a first angle relative to the first side and wherein the step of forming the first end is further defined as the step of cutting the first end to the first angle.

5. The method as set forth in claim 4 wherein the second end of the extrudate defines a second angle relative to the second side and wherein the step of forming the second end is further defined as the step of cutting the second end to the second angle.

6. The method as set forth in claim 5 wherein the first and second angles are each defined as less than 45 degrees.

7. The method as set forth in claim 1 further including the step of wrapping the extrudate about the mandrel to form a third layer on top of the second layer.

8. The method as set forth in claim 7 wherein the extrudate is defined as a continuous piece of extrudate between the first and second ends and wherein the steps of wrapping the extrudate about the mandrel is further defined as the steps of wrapping the continuous piece of extrudate about the mandrel to form the first, second, and third layers.

9. The method as set forth in claim 7 wherein the third layer has the second end and wherein the step of aligning the second end complementary to the first end of the first layer in a spaced relationship is further defined as the step of aligning the second end of the third layer complementary to the first end of the first layer in the spaced relationship to define the preform having the substantially uniform exterior surface and the substantially uniform thickness.

10. The method as set forth in claim 9 wherein the step of forming the first end occurs before the step of forming the second end.

11. The method as set forth in claim 9 further including a pressure-applying device adjacent the mandrel and wherein the steps of applying pressure to the first and second layers are further defined as the steps of applying pressure to the first, second, and third layers during wrapping of the extrudate about the mandrel.

12. The method as set forth in claim 11 wherein the step of applying pressure to the first layer occurs before the steps of applying pressure to the second and third layers.

13. The method as set forth in claim 1 wherein the second layer has the second end and wherein the step of aligning the second end complementary to the first end of the first layer in a spaced relationship is further defined as the step of aligning the second end of the second layer complementary to the first end of the first layer in the spaced relationship to define the preform having the substantially uniform exterior surface and the substantially uniform thickness.

14. The method as set forth in claim 1 wherein the extrudate is defined as a continuous piece of extrudate between the first and second ends and wherein the steps of wrapping the extrudate about the mandrel is further defined as the steps of wrapping the continuous piece of extrudate about the mandrel to form the first and second layers.

15. The method as set forth in claim 1 wherein the step of forming the first end occurs before the step of forming the second end.

16. The method as set forth in claim 1 wherein the step of forming the first end occurs before the step of wrapping the extrudate about the mandrel to form a second layer.

17. The method as set forth in claim 1 wherein the step of forming the second end occurs after the step of wrapping the extrudate about the mandrel to form a second layer.

18. The method as set forth in claim 1 wherein the step of applying pressure to the first layer occurs before the step of applying pressure to the second layer.

19. A method of forming a ceramic preform comprising ceramic particles and ceramic fibers having an aspect ratio of greater than or equal to 10:1 and the ceramic fibers substantially randomly orientated in three dimensions utilizing an extruder and a mandrel rotatable about an axis and having an outer surface spaced radially from the axis, said method comprising the steps of:
    extruding the ceramic particles and the ceramic fibers through the extruder to form an extrudate having a first end and a second end with the extrudate having a substantially rectangular cross-section between the first and second ends and having planar exterior surfaces;
    forming the first end of the extrudate;
    wrapping the extrudate about the mandrel while rotating the mandrel about the axis to form a first layer having the substantially rectangular cross-section and having the first end abutting the outer surface of the mandrel;
    applying pressure to the first layer during wrapping of the extrudate about the mandrel;
    forming the second end of the extrudate complementary in configuration to the first end;
    wrapping the extrudate about the mandrel while rotating the mandrel about the axis to form a second layer having the substantially rectangular cross-section on top of the first layer with the second end spaced from the outer surface of the mandrel;
    applying pressure to the second layer during wrapping of the extrudate about the mandrel; and
    aligning the second end complementary to the first end of the first layer in a spaced relationship to define the preform having a substantially uniform exterior surface and a substantially uniform thickness.

20. The method as set forth in claim 19 further including the step of wrapping the extrudate about the mandrel to form a third layer having the substantially rectangular cross-section on top of the second layer.

21. The method as set forth in claim 20 wherein the extrudate is defined as a continuous piece of extrudate between the first and second ends and wherein the steps of wrapping the extrudate about the mandrel is further defined as the steps of wrapping the continuous piece of extrudate about the mandrel to form the first, second, and third layers.

22. The method as set forth in claim 21 wherein the third layer has the second end and wherein the step of aligning the second end complementary to the first end of the first layer in a spaced relationship is further defined as the step of aligning the second end of the third layer complementary to the first end of the first layer in the spaced relationship to define the preform having the substantially uniform exterior surface and the substantially uniform thickness.

23. The method as set forth in claim 19 wherein the extrudate is formed from a composition comprising:
    the ceramic particles;
    the ceramic fibers having an aspect ratio of greater than or equal to 10:1;
    an organic binder comprising a cellulose ether;
    an inorganic binder comprising silica; and
    water.

24. The method as set forth in claim 19 wherein the extrudate includes a first side and a second side opposing the first side such that the first and second layers include the first and second sides and wherein the step of wrapping the extrudate about the mandrel to form a first layer is further defined as abutting the first side of the first layer to the mandrel.

25. The method as set forth in claim 24 wherein the step of wrapping the extrudate about the mandrel to form a second layer is further defined as abutting the first side of the second layer to the second side of the first layer.

26. The method as set forth in claim 21 further including a pressure-applying device adjacent the mandrel and wherein the steps of applying pressure to the first and second layers are further defined as the steps of applying pressure to the first, second, and third layers during wrapping of the extrudate about the mandrel.

27. The method as set forth in claim 19 wherein the step of applying pressure to the first layer occurs before the step of applying pressure to the second layer.

\* \* \* \* \*